(12) United States Patent
Kohlen et al.

(10) Patent No.: US 7,143,996 B2
(45) Date of Patent: Dec. 5, 2006

(54) THROTTLE CONNECTION FITTING FOR AN INTERNAL COMBUSTION ENGINE

(75) Inventors: Peter Kohlen, Neu-Anspach (DE); Rolf Oppermann, Schwalbach (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 10/778,037

(22) Filed: Feb. 17, 2004

(65) Prior Publication Data

US 2004/0159815 A1  Aug. 19, 2004

Related U.S. Application Data

(63) Continuation of application No. PCT/DE02/03039, filed on Aug. 19, 2002.

(30) Foreign Application Priority Data

Aug. 23, 2001   (DE) ................................ 101 40 394

(51) Int. Cl.
*F16K 1/22* (2006.01)
(52) U.S. Cl. ........................ 251/305; 123/337; 251/359
(58) Field of Classification Search ................ 251/305, 251/306, 359; 123/337
See application file for complete search history.

(56) References Cited

U.S. PATENT DOCUMENTS

| 2,817,489 | A | * | 12/1957 | Hesmer ....................... 251/305 |
| 3,498,584 | A | * | 3/1970 | Bowers ....................... 251/305 |
| 4,047,696 | A | | 9/1977 | Ludwig |
| 4,944,490 | A | | 7/1990 | Kennedy |
| 5,669,350 | A | | 9/1997 | Altmann et al. |
| 5,741,006 | A | * | 4/1998 | Murai et al. ................. 251/305 |
| 6,646,395 | B1 | * | 11/2003 | Reimann .................... 251/305 |

FOREIGN PATENT DOCUMENTS

| DE | 4235825 C1 | 4/1994 |
| DE | 4323078 A1 | 1/1995 |
| DE | 4408909 A1 | 9/1995 |
| DE | 19508355 A1 | 6/1996 |
| EP | 0899073 A2 | 3/1999 |
| EP | 1126146 A2 * | 8/2001 |
| WO | WO97/04259 | 2/1997 |

OTHER PUBLICATIONS

Derwent Abstract DE19508355A; 06/05/196; VDO Schindling.
Derwent Abstract JP09 195803; Jul. 29, 1997; Nissan Motor Co. Ltd.
Derwent Abstract DE4408909; Aug. 21, 1995; Robert Bosch GmbH.
Derwent Abstract DE4235825; Apr. 28, 1994; Controls Engineering CA AG.
Derwent Abstract DE4323078; Jan. 12, 1995; Pierburg GmbH.
Derwent Abstract EP0899073; Mar. 3, 1999; Siemens Automotive Corp.

* cited by examiner

*Primary Examiner*—John Bastianelli
(74) *Attorney, Agent, or Firm*—Siemens AG

(57) ABSTRACT

A throttle valve connection piece for an internal combustion engine is disclosed, the piece including a housing and a throughflow opening in which the valve is pivotably mounted around a pivot axis. The pivot axis extends in a perpendicular manner with respect to a longitudinal axis the opening. The valve is used to close the throughflow opening. When in a closed position, the valve is inclined at a defined setting angle in relation to the longitudinal axis. The radial peripheral edge of the valve rests against the inner wall of the throughflow opening and the throughflow opening has a cylindrical shape at least in the region where the valve comes to rest. The cylindrical region of rest in relation to the longitudinal axis of the throughflow opening forms a circular cylinder which is cut on both sides at a certain angle, the levels of the cut are inclined at a similar angle in relation to the longitudinal axis.

9 Claims, 3 Drawing Sheets

THROTTLE CONNECTION FITTING FOR AN INTERNAL COMBUSTION ENGINE

CROSS REFERENCE TO RELATED APPLICATIONS

The present application is a continuation of international application PCT/DE02/03039, filed 19 Aug. 2002, and further claims priority to German patent application 10140394.1, filed 23 Aug. 2001, the both of which are herein incorporated by reference.

BACKGROUND OF THE INVENTION

The present invention relates to a throttle valve connection fitting or piece for an internal combustion engine. Such fittings may be made integral or modular depending upon application. The throttle valve may comprise a butterfly valve. Generally, such fittings include an internal through-opening with the valve pivotably mounted therein. The valve may be made to pivot between an open and shut position which, respectively, facilitate and halt flow through the opening. To facilitate the pivoting, the valve may be mounted on a pivot axis which would run transverse to a longitudinal axis of the opening.

In the closed position, the ends of the valve contact the interior walls of the opening thereby preventing through passage. In the closed position, the valve is inclined by a certain setting angle relative to the longitudinal axis and bearing, at a bearing region, with its radially encircling edge against the inner wall of the opening. The opening includes a cylindrical design at least in the bearing region of the valve.

In order to obtain precisely definable throughflow cross sections in the region of the valve, in particular close to the closed position, and in order to ensure satisfactory closing in the closed position, the throughflow opening of the valve connection piece is designed to be cylindrical in the bearing region of the valve. Since the valve, in its closed position, is inclined relative to the longitudinal axis of the throughflow opening by the setting angle, this region of cylindrical cross section extends over the entire length which is covered by the valve located in the closed position. This length of about 7 to 10 mm is too large for it to be capable of being produced with a single cylindrical core, since no demolding is then possible without damage to the cylindrical wall by scores.

In order to achieve damage-free demolding, two cores are used, whose end regions facing one another are cylindrical and come to bear against one another for the die-casting/injection-molding operation.

However, this results in a forming ridge at this bearing point between the two cores and also in an axial offset due to tolerances, which necessitates rework after the demolding, since otherwise the valve may jam in its closed position.

SUMMARY OF THE INVENTION

An object of the present invention is to provide a throttle valve connection fitting comprising a cylindrical throughflow opening which is offset and substantially rework-free. An additional object of the present invention is to provide a method for making the aforementioned fitting.

These and other objects are achieved in that the bearing region designed to be cylindrical relative to the longitudinal axis of the throughflow opening forms a circular cylinder which is truncated on both sides at an angle, and whose cutting planes are inclined relative to the longitudinal axis of the throughflow opening at at least approximately the same setting angle as the throttle valve when the valve is in the closed position.

In a butterfly valve connection piece of such a design, the requisite circular-cylindrical inner contour of the throughflow opening is only present where it is required for ensuring the satisfactory closing in the closed position of the valve by virtue of the cylindrical region being inclined relative to the longitudinal axis of the passage opening in the closed position in accordance with the setting angle of the valve. The cylindrically designed longitudinal extent of the bearing region can thus be designed to be small such that it may be produced and molded with a single cylindrical core, without offset, scores, and the development of a forming ridge.

A butterfly valve connection piece produced in this way can preferably be used in “electronic throttle control systems”. However, other applications, such as in exhaust-gas recirculation systems, are possible.

In this case, the cylindrically designed longitudinal extent of the bearing region along its encircling contour can preferably be approximately equal to or greater than the thickness of the butterfly valve. This means that, contrary to the hitherto normal cylindrical length of about 7 to 10 mm, only a cylindrical length of about 3 mm is required.

According to the present inventive method, a first core and a second core are arranged coaxially to one another, in an outer housing mold, for producing the passage opening. The first and second cores, with their end faces facing one another, are brought to bear against one another, and, are encapsulated by die-casting/injection molding. The end faces, bearing against one another are inclined relative to the longitudinal axis of the cores at at least approximately the same angle as the setting angle of the valve. The first core, starting from its surface bearing against the second core, has a region which is a circular cylinder region truncated on both sides at this angle. Those regions of the first and second cores which adjoin the circular cylinder region have a greater cross section than the circular cylinder region.

During demolding, the cores are moved away from one another, axially. This is effected without the formation of scores on account of the small length of the circular-cylindrical region. An offset in the circular-cylindrical region is not possible, since the latter is produced with a single cylindrical core part. Removal of a forming ridge is not necessary, since this forming ridge is located outside the cylindrical bearing region of the butterfly valve.

Furthermore, easy demolding is further assisted by those regions of the first and/or of the second core which adjoin the truncated circular cylinder region having a conically widening cross section starting from the circular cylinder region. The housing or the cylindrical insert for the housing of the butterfly valve connection piece can be produced by the cores being encapsulated with aluminum.

However, it is also possible for the cores to be encapsulated with a plastic, which is preferably a thermoplastic or a thermosetting plastic.

BRIEF DESCRIPTION OF THE SEVERAL VIEWS OF THE DRAWINGS

An exemplary embodiment of the invention is shown in the drawing and described in more detail below. In the drawing:

FIG. 1 depicts a cross section of a fitting housing; and

FIG. 2 depicts the fitting housing, in cross section, with a spaced first and second core.

DETAILED DESCRIPTION OF THE INVENTION

Figure 1:
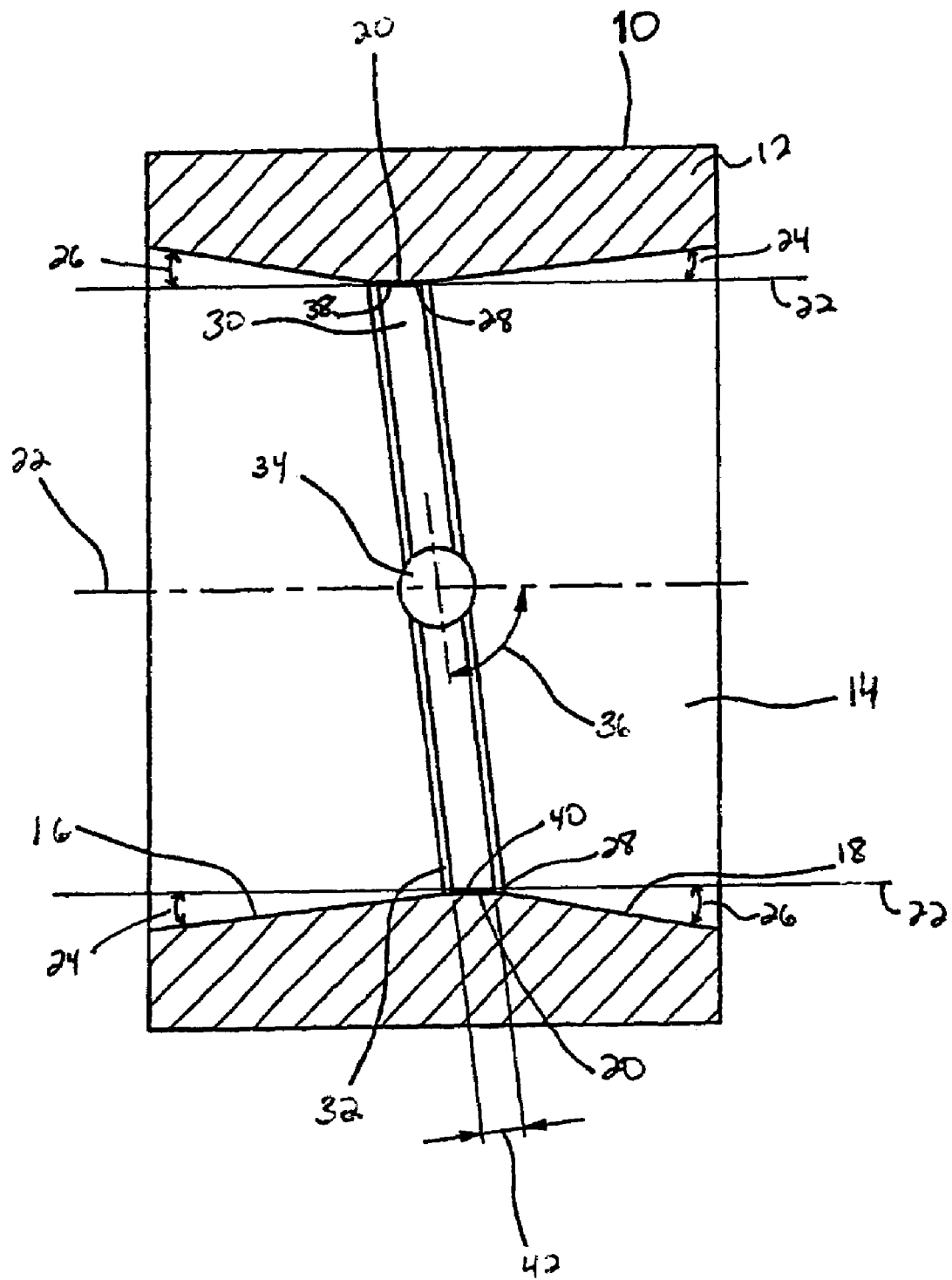

FIG. 1 depicts a cross section of the throttle valve connection piece housing 10. The housing comprises wall 12 defining a hollow internal through opening or passage 14 having a substantially rounded internal surface. As depicted by the cross section, the internal surface comprises a first region 16, a second region 18 and a bearing surface 20 located therebetween. The opening runs along a centrally depicted longitudinal axis 22. The first region is inclined with respect to the longitudinal axis 22 at a first angle 24 (the longitudinal axis 22 has been depicted proximate to the surfaces for clarity). The second region is inclined to the longitudinal axis 22 at a second angle 26. The bearing surface 20 defines a third smaller angle 28 to the longitudinal axis 22 than the first angle 24, itself being smaller than the second angle 26. Considering the rounded nature of the interior surfaces, the first and second regions define a substantial conical shape with respect to the longitudinal axis 22, while the bearing region 20 defines a substantially circular shape.

A throttle valve 30 is located within the passage 14. The valve 30 may comprise a butterfly valve. The valve 30 comprises walls defining a substantially cylindrical body 32 running an approximate diameter of the passage 14. Alternatively, the valve may be housed within a cylindrical housing having walls. Valve 30 is pivotably mounted on a centrally located pivot axis 34 running transverse to the longitudinal axis 22. The valve may be pivoted between at least two positions, an open position facilitating flow threw the passage, and a closed position depicted in FIG. 1 wherein flow is halted. The valve 30 in the closed position defines a fourth angle 36 with respect to the longitudinal axis 22. The valve 30 comprises two opposing ends 38 and 40 which, in the closed position, abut the bearing surface 20. In order to ensure effective halting of flow threw, the ends 38 and 40 may comprise surfaces inclined to substantially mate with the respective bearing surfaces. Accordingly, the length (42) of the bearing surfaces 20 may be substantially equal to or larger than the length of end surfaces (38, 40). By way of example, the bearing and ends surfaces may be about 3 mm. A difference between the two surfaces may be in the range of a few tenths of a millimeter.

The method of making the fitting depicted in FIG. 1 will now be described with reference to FIG. 2. Like numerals depict at least equivalent elements.

Figure 2:
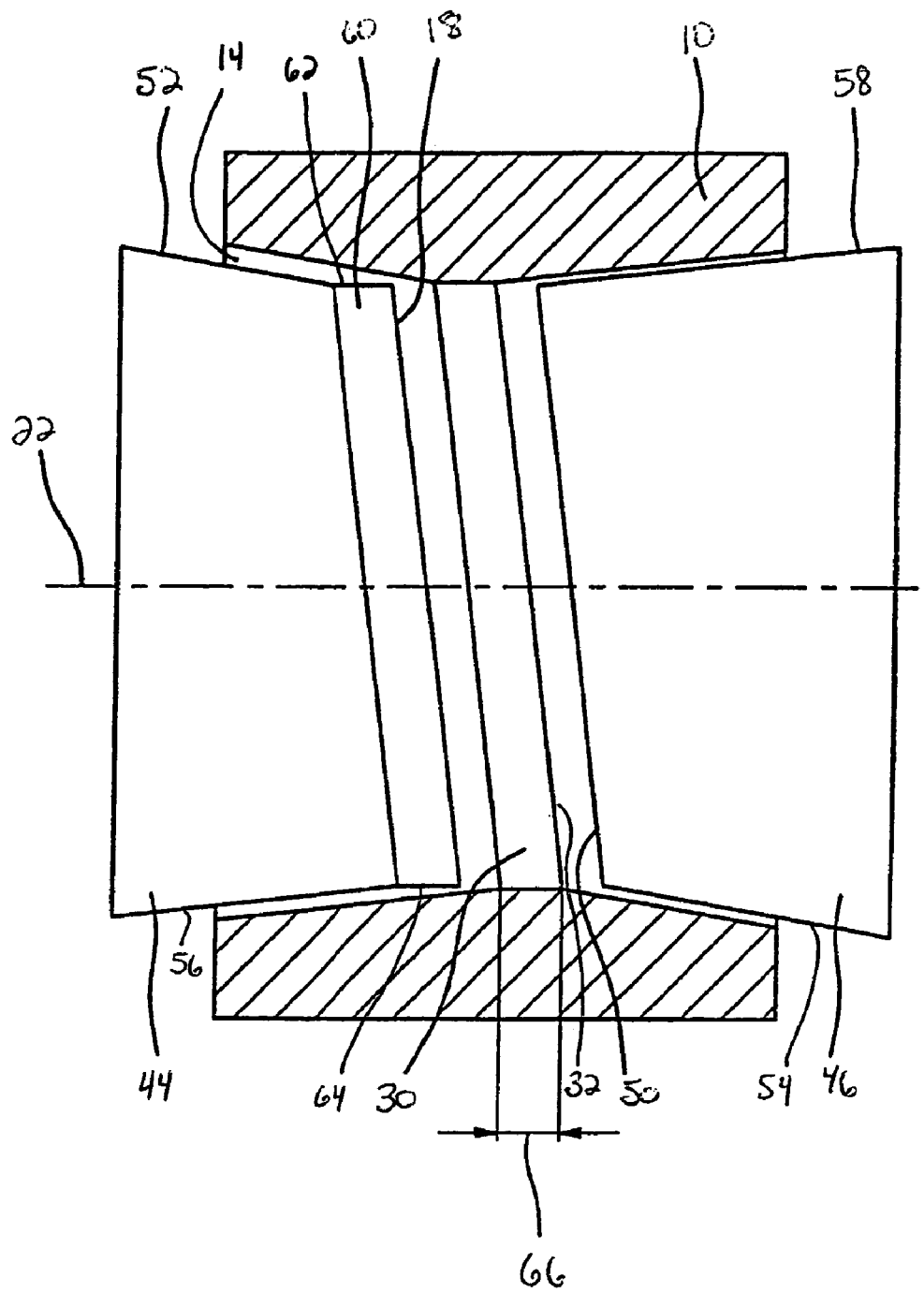

FIG. 2 depicts a cross section of the fitting 10. Included in the passage 14 are a first core 44 and second core 46. The first and second cores comprise walls defining opposing and facing surfaces 48 and 50. As will be discussed below, the surfaces are formed so as to mate substantially seamlessly during use. The cores further comprises side walls included at angles substantially mated to the first and second angles. As depicted, first core 44 includes an 'upper' or top facing wall 52 inclined at an angle to longitudinal axis 22 mated to second angle 26. Such is also true for 'lower' or bottom facing wall 54 of second core 46. Likewise, the lower wall of the first core 56 and the upper wall of the second core 58 are inclined at an angle matching first angle 24.

First core 44 includes an extension 60 extending in a direction of the second core 46. The extension 60 surface facing the second core is the first cores opposing and facing surface 48. The extension 60 includes an upper and lower surface 62 and 64 inclined at an angle to the longitudinal axis 22 which matches third angle 28. Angle 28 as defined by (depicted) upper and lower internal is substantially the same. The width of the extension (66) substantially matches the width of valve 30 or valve housing 32 depending upon embodiment (depicted in FIG. 2 for illustration). Accordingly, extension 60 defines a substantially cylindrical shape.

For purposes of clarity, the cores are depicted in somewhat separated positions. In operation, as will be described below, the two cores are brought together within the passage.

Figure 3:
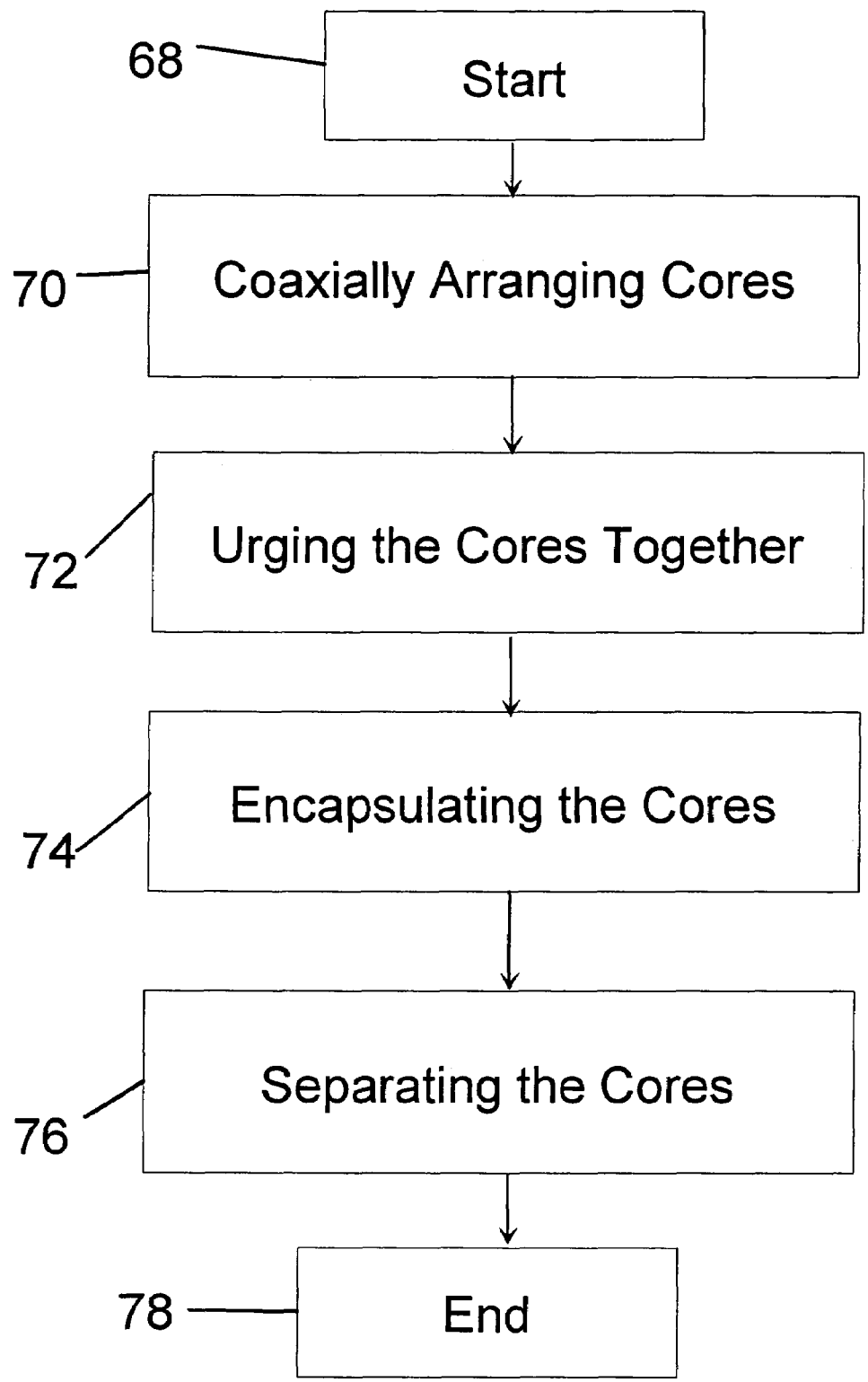

A method of making the above described fitting will now be described with general reference to the figures and FIG. 3 in particular.

The method starts 68 and proceeds to the step of arranging the cores with respect to one another. In particular, the cores are arranged substantially coaxially, such that the facing surfaces 48 and 50 face one another. Next, the cores are urged together such that the facing surfaces abut one another and are otherwise flush, with the extension being accommodated between a remainder of the first core and the second core. Next, the abutting cores are encapsulated. The encapsulating may comprise encapsulating the cores by die-casting or injection molding. The encapsulating may include the following materials: aluminum, plastic, thermoplastic and thermosetting plastic.

The invention being thus described, it will be obvious that the same may be varied in many ways, including application of the present system to traditional brick and mortar stores. Such variations are not to be regarded as a departure from the spirit and scope of the invention, and all such modifications would be obvious to one skilled in the art are intended to be included within the scope of the following claims.

We claim:

1. A throttle valve connection fitting for an internal combustion engine, comprising
    a housing having walls defining an internal through opening extending along a longitudinal axis, said opening comprising opposing internal surfaces defining a first and second region with a bearing region therebetween, said first region inclined at a first angle to said longitudinal axis, said second region inclined at a second angle to said longitudinal axis and said bearing region inclined at a third angle to said longitudinal axis such that said third angle is smaller than said first angle which is smaller than said second angle, said first and second region defining a substantially conical shape and said bearing region defining a substantially circular shape along said longitudinal axis; and
    a throttle valve located within said opening, said valve having a cylinder body with ends defining an angle to said longitudinal axis substantially equal to said third angle when said valve is in a closed position, said valve pivotably mounted on a pivot axis extending transverse to said longitudinal axis such that said valve pivots between an open position and said closed position, said open position permitting throughflow and said closed position halting said throughflow, and said closed position further defined by said valve positioned such that said ends contact said bearing region.

2. The throttle valve according to claim 1, wherein a length of said bearing region along said interior walls is approximately equal to a thickness of said throttle valve.

3. The fitting according to claim 1, wherein a length of said bearing region along said interior walls as greater than a thickness of said throttle valve.

4. The fitting according to claim 1, wherein regions of at least one of the first and second core which adjoin the truncated circular cylinder region have a conically widening cross section starting from the circular cylinder region.

5. The fitting according to claim 1, wherein said housing is modular.

6. The fitting according to claim 1, wherein said throttle valve is a butterfly valve.

7. The fitting according to claim 1, wherein said opening is substantially circular with respect to said longitudinal axis at said bearing region and substantially conical with respect to said longitudinal axis at said circular cylindrical region.

8. The fitting according to claim 1, wherein said bearing region is approximately 3 millimeters in length.

9. The fitting according to claim 1, wherein said ends are approximately 3 millimeters in length.

* * * * *